(12) United States Patent
Mohr et al.

(10) Patent No.: US 9,771,975 B2
(45) Date of Patent: Sep. 26, 2017

(54) DEVICE FOR THE DETACHABLE CONNECTION OF A FURNITURE PULL-OUT MOVABLY GUIDED IN A FURNITURE BODY VIA A GUIDE UNIT WITH THE GUIDE UNIT

(71) Applicant: Grass GmbH, Höchst (AT)

(72) Inventors: Emanuel Mohr, Bezau (AT); Stephan Mittwoch, Dornbirn (AT); Felix Karu, Altach (AT)

(73) Assignee: Grass GmbH, Höchst (AT)

( * ) Notice: Subject to any disclaimer, the term of this patent is extended or adjusted under 35 U.S.C. 154(b) by 0 days.

(21) Appl. No.: 15/053,651

(22) Filed: Feb. 25, 2016

(65) Prior Publication Data

US 2016/0242543 A1   Aug. 25, 2016

(30) Foreign Application Priority Data

Feb. 25, 2015  (DE) .................... 20 2015 001 489 U

(51) Int. Cl.
| | |
|---|---|
| A47B 88/00 | (2017.01) |
| F16C 29/02 | (2006.01) |
| F16C 29/00 | (2006.01) |
| A47B 88/407 | (2017.01) |
| A47B 88/427 | (2017.01) |

(52) U.S. Cl.
CPC ............ *F16C 29/02* (2013.01); *A47B 88/407* (2017.01); *A47B 88/427* (2017.01); *F16C 29/004* (2013.01); *A47B 2088/4274* (2017.01); *A47B 2088/4278* (2017.01); *A47B 2210/097* (2013.01)

(58) Field of Classification Search
CPC ............ A47B 88/0055; A47B 88/0422; A47B 88/0433; A47B 88/0437; A47B 2088/0074; A47B 2210/09; A47B 2210/0054; A47B 2210/0056
USPC ......... 312/334.4, 334.5, 334.6, 348.1, 348.2; 384/22; 403/331, 322.4, 325, 326
See application file for complete search history.

(56) References Cited

U.S. PATENT DOCUMENTS

| | | | | |
|---|---|---|---|---|
| 5,439,283 A | * | 8/1995 | Schroder ............ | A47B 88/0407 312/334.38 |
| 5,580,139 A | * | 12/1996 | Grabher ............. | A47B 88/0422 312/333 |

(Continued)

FOREIGN PATENT DOCUMENTS

| | | |
|---|---|---|
| AT | 9972 U1 | 7/2008 |
| AT | 506879 | * 12/2009 |

(Continued)

OTHER PUBLICATIONS

European Serach Report and Written Opinion in corresponding European application No. 16157077.5, with English translation.

*Primary Examiner* — Janet M Wilkens
(74) *Attorney, Agent, or Firm* — Edell, Shapiro & Finnan LLC

(57) ABSTRACT

In the case of a device for the detachable connection of a furniture pull-out movably guided in a furniture body via a guide unit with the guide unit having at least one adapter element detachably connectable with a running rail of the guide unit and having fastening elements for fixing the adapter element to a component of the furniture pull-out, the fastening elements comprise a catch for the detachable fastening of the adapter element to an assigned component of the furniture pull-out.

7 Claims, 7 Drawing Sheets

(56) References Cited

U.S. PATENT DOCUMENTS

| | | | | |
|---|---|---|---|---|
| 5,588,729 A | * | 12/1996 | Berger | A47B 88/0422 312/330.1 |
| 5,775,787 A | * | 7/1998 | Gasser | A47B 88/10 312/333 |
| 8,336,973 B2 | * | 12/2012 | Berger | A47B 88/0422 312/334.4 |
| 8,764,136 B2 | * | 7/2014 | Grabherr | A47B 88/0422 312/334.27 |
| 8,854,769 B1 | * | 10/2014 | Liang | A47B 88/0422 360/125.51 |
| 9,066,587 B1 | * | 6/2015 | Liang | A47B 88/0422 |
| 9,095,211 B2 | * | 8/2015 | Amann | A47B 88/0422 |
| 2002/0158557 A1 | * | 10/2002 | Weichelt | A47B 88/0422 312/334.4 |
| 2004/0095047 A1 | * | 5/2004 | Salice | A47B 88/0422 312/332.1 |
| 2004/0227440 A1 | * | 11/2004 | Booker | A47B 88/0422 312/334.1 |
| 2008/0218045 A1 | * | 9/2008 | Moser | A47B 88/0422 312/333 |
| 2009/0251037 A1 | * | 10/2009 | Berger | A47B 88/0422 312/334.1 |
| 2009/0261700 A1 | * | 10/2009 | Chen | A47B 88/0422 312/334.46 |
| 2011/0129172 A1 | * | 6/2011 | Liang | A47B 88/0422 384/22 |
| 2012/0217857 A1 | * | 8/2012 | Grabherr | A47B 88/427 312/334.1 |
| 2012/0292465 A1 | * | 11/2012 | Holzer | A47B 88/0422 248/201 |
| 2014/0185968 A1 | * | 7/2014 | Langguth | A47B 88/0055 384/22 |
| 2014/0210330 A1 | * | 7/2014 | Amann | A47B 88/0422 312/334.1 |
| 2014/0314347 A1 | * | 10/2014 | Huang | A47B 88/0407 384/22 |

FOREIGN PATENT DOCUMENTS

| | | | |
|---|---|---|---|
| AT | 510714 | * | 6/2012 |
| AT | 511294 | * | 10/2012 |
| DE | 2745281 | A1 | 4/1979 |
| DE | 20108388 | U1 | 9/2002 |
| DE | 202005018788 | U1 | 4/2007 |
| DE | 102007005950 | A1 | 8/2008 |
| DE | 202014106123 | * | 1/2015 |
| WO | 2012068594 | * | 5/2012 |

* cited by examiner

DEVICE FOR THE DETACHABLE CONNECTION OF A FURNITURE PULL-OUT MOVABLY GUIDED IN A FURNITURE BODY VIA A GUIDE UNIT WITH THE GUIDE UNIT

CROSS REFERENCE TO RELATED APPLICATIONS

This application claims foreign priority under 35 U.S.C. §119(a)-(d) to Application No. DE 202015001489.5 filed on Feb. 25, 2015, the entire contents of which are hereby incorporated by reference.

FIELD OF THE INVENTION

The invention relates to a device for the detachable connection of a furniture pull-out movably guided in a furniture body via a guide unit with the guide unit having at least one adapter element detachably connectable with a running rail of the guide unit and having a fastener that fixes the adapter element to a component of the furniture pull-out.

BACKGROUND

Such devices for the detachable connection of a furniture pull-out movably guided in a furniture body via a guide unit with the guide unit are known, for example, from DE 20 2009 017 319 U1. There, a furniture pull-out is described in the form of a drawer which is connected via a catch coupling with a drawer bottom. The catch coupling has a fastening section for the connection with the drawer bottom of the drawer, which fastening section has two mounting holes, by which a fastening to the drawer bottom occurs via mounting screws.

SUMMARY

The object of the invention is to create a device of the type mentioned at the outset, in which a furniture pull-out and guide unit can be connected with each other in a simple and rapid manner, wherein in particular the dismantling of the furniture pull-out and guide unit can also be implemented in a simple and rapid manner.

The device according to the present invention is characterized in that the fastener comprises a catch for the detachable fastening of the adapter element to the assigned component of the furniture pull-out.

In contrast to the aforementioned prior art, in which at least two screw connections are required for fastening the furniture pull-out to the guide rail of the guide unit, in the case of the invention a catch is now used, whereby at least one screw connection can be saved compared to the prior art. Since a guide device as a rule has at least two guide rails assigned to side edges of the furniture pull-out arranged opposite each other, which rails in each case must be connected via a separate adapter element with the furniture pull-out, in this embodiment at least two screw connections are therefore saved.

In an especially preferred manner, the fastener is furnished for the screwless fastening of the adapter element. Advantageously the fastener in this case therefore consists only of the catch, which permits a screwless fastening of the adapter element to the furniture pull-out. Alternatively, it would be conceivable, that the adapter element is fastened to the furniture pull-out via the catch and a single screw connection, thus, as already mentioned, one screw connection can be saved compared to the prior art.

In the case of a further development of the invention, components of the catch are arranged on the adapter element and other components on the furniture pull-out.

In the case of a further development of the invention, the catch has catch receptacles and catch members which can be snapped into the catch receptacles when snapped into place.

In an especially preferred manner the adapter element has a catch section provided with components of the catch, which during the fastening can be brought into contact with a counter-catch section on the furniture pull-out provided with other components on the catch such that a catch connection can be established.

In an especially preferred manner the catch section has a U-shaped fastening profile for clasping the counter-catch section.

The fastening profile can have a receptacle groove for receiving the counter-catch section. Advantageously, the counter-catch section is a sheet-like section of a component of the furniture pull-out, which dips into the receptacle groove in the assembly position of the adapter element.

In an especially preferred manner the fastening profile has at least one catch member in the form of an elastically resilient catch nose which can be snapped into place with the counter-catch section.

The fastening profile can have a catch projection, to which a catch receptacle on the counter-catch section can be assigned, such that a depth catch of the adapter element can be established on the side wall.

In the case of a further development of the invention, the device comprises at least one furniture pull-out, in particular a drawer.

Advantageously, the furniture pull-out has side walls and a bottom, wherein the counter-catch section is arranged on at least one side wall, in particular, side wall element and/or on the bottom.

Especially preferably the counter-catch section has a catch receptacle in the form of a recess formed in the side wall.

In the case of a further development of the invention, the side walls are designed as side frames.

It is possible, that the counter-catch section is formed on a catch component separate from the side wall and the bottom, which can be mounted or is mounted for its part on the assigned side wall or on the bottom.

The invention also comprises a piece of furniture, with a furniture pull-out movable relative to a furniture body, guided via a guide unit.

BRIEF DESCRIPTION OF THE DRAWINGS

Preferred embodiments of the invention are depicted in the drawing and are explained in detail below. In the drawing.

DETAILED DESCRIPTION

Figure 1:
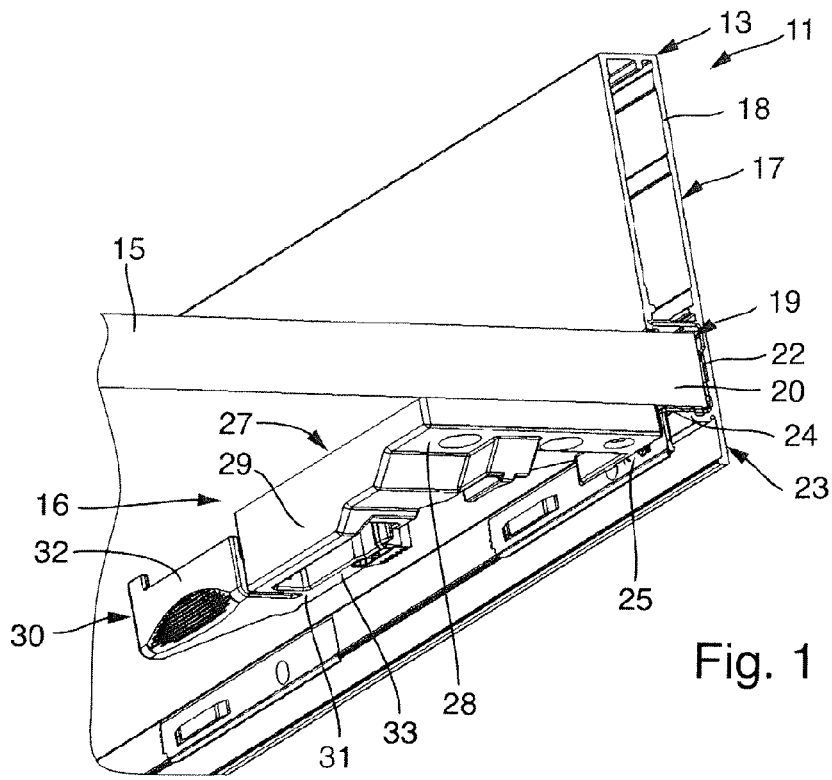
FIG. 1 shows a perspective view of a first embodiment of the device according to the present invention, wherein the adapter element of the device is fastened to a side wall element of the furniture pull-out.
Figure 2:
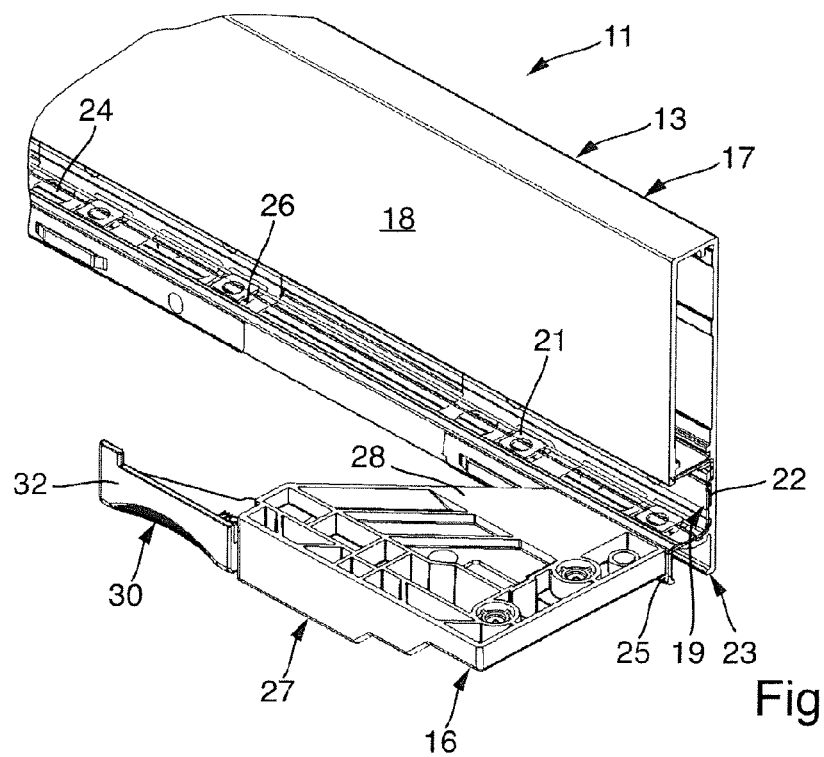
FIG. 2 shows a perspective view of the device of FIG. 1, wherein the adapter element is fastened on the side wall of the furniture pull-out, however, the bottom of the furniture pull-out is missing.
Figure 3:
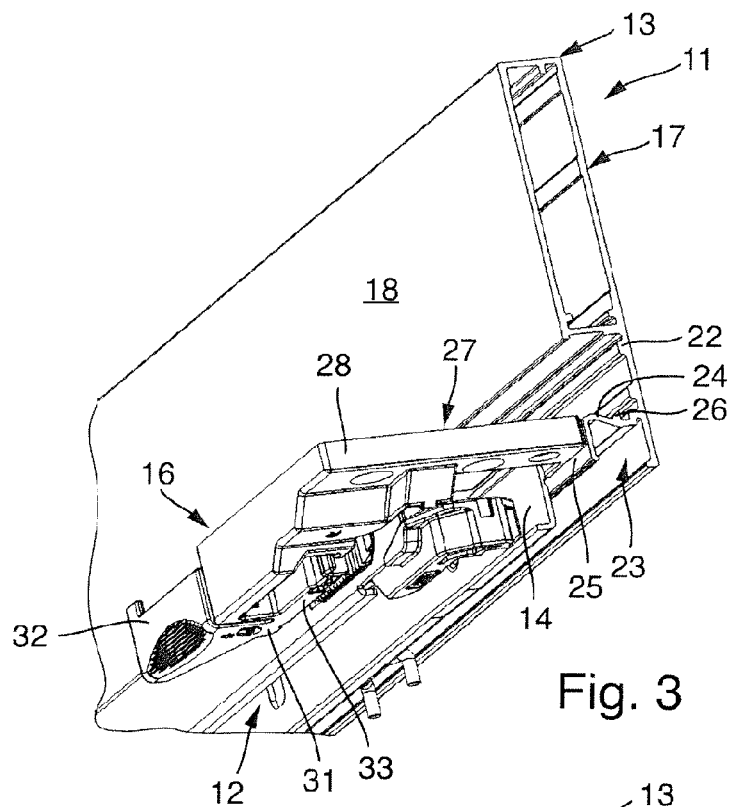
FIG. 3 shows a perspective view of the device from FIG. 1, wherein to fasten the adapter element to the side wall another guide rail of the furniture pull-out is additionally fastened to the adapter element.
Figure 4:
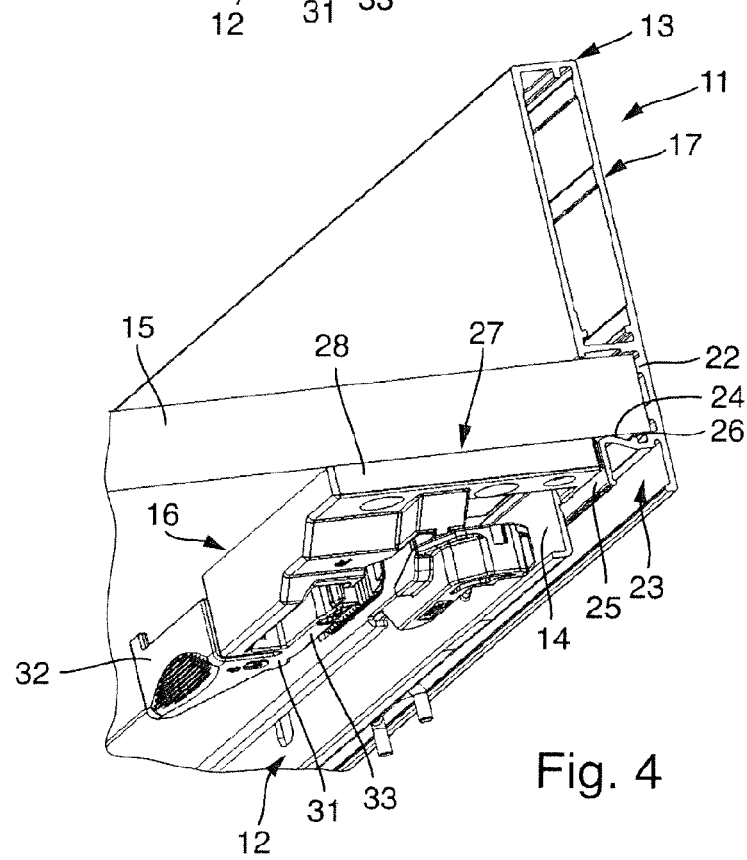
FIG. 4 shows a perspective view of the device from FIG. 3 with bottom.

FIGS. 1 to 4 show a first embodiment of the device 11 according to the present invention for the detachable connection of a furniture pull-out 13 movably guided in a furniture body (not depicted) via a guide device. The invention is shown and described below exemplarily via a furniture pull-out 13 designed as a drawer. It is of course possible to use the device 11 on other movable furniture parts as well, for example, on furniture pull-outs different from drawers.

The drawer is slidably mounted relative to a furniture body via a guide device. The guide device comprises several guide units 12, which are arranged on side edges of the drawer opposite each other. Only one of the guide units 12 is exemplarily depicted.

The guide unit 12 has a body rail (not depicted), which can be designed, for example, as a bent sheet metal part. The body rail is securely fixed in position via a suitable fastener to an assigned side wall of a drawer receptacle formed in the furniture body. On the body rail a middle rail can be slidably mounted, on which in turn a running rail 14, which is referred to in the exemplary case also as a drawer rail, is slidably guided via one or more bearings. The running rail is assigned to the drawer and runs underneath the drawer bottom 15 in the depth direction. The combination of body rail, middle rail and running rail is referred to as a full pull-out. However, it is also conceivable to use guide units 12 without a middle rail.

The need exists to couple the running rail 14 with the furniture pull-out 13, that is the drawer, whereby the drawer is moved with the running rail 14 when extending and retracting the running rail 14. The device 11, therefore, comprises an adapter element 16 detachably connectable with the running rail 14 and the fastener for fixing the adapter element 16 on a component of the furniture pull-out 13.

A side wall element 17 of a drawer is depicted exemplarily in FIGS. 1 to 4 as a component of the furniture pull-out 13. The side wall element 17 can be designed as an extruded aluminum profile part. Alternatively, however, it would also be possible to produce the side wall element 17 from steel material, in particular, in several parts from a piece of a tailor-made flat or level sheet metal material, for example, by bending and punching processes.

The side wall element 17 has a hollow profile-like base section 18, which extends as a drawer side wall above the drawer bottom 15. A front fastener (not depicted) for fastening a front, for example, front panel, can be received in the hollow chamber of the base section 18. Underneath the base section 18 of the side wall element 17, a bottom receptacle section 19 is connected either designed as a single-piece with the latter or as a separate component. The bottom receptacle section 19 is designed as a receptacle groove and runs along the side wall element 17 in the depth direction. The edge section 20 of the drawer bottom 15 of the drawer can be inserted into the bottom receptacle section 19.

The bottom receptacle section 19 also has a bottom fastener 21, with which an edge section 20 of the drawer bottom 15 introduced into the bottom receptacle section 19 can be fastened on the side wall element 17, in particular, if the drawer bottom 15 consists of wood. The bottom receptacle section 19 designed in a groove-shaped manner is limited on the top side by the underside of the bottom section 18 and laterally by a bearing web 22 positioned on the bottom section 18, protruding from here substantially at a right angle, as well as on the bottom side by a mounting section 23 protruding in turn substantially at a right angle from the bearing web 22. The mounting section 23 can be divided into a fastening leg 24, which is connected with the bearing web 22 and an edge web 25. The edge web 25 runs substantially parallel to the bearing web 22. Several claw elements 26 arranged behind each other in the longitudinal direction of the mounting section 23 are located on the fastening leg 24, which claw elements can penetrate into the material of the drawer bottom 15 and thus provide for a secure reception of the drawer bottom 15 in the bottom receptacle section 19 of the side wall element 17.

The adapter element 16 of the device 11 has an adapter housing 27, which consists of plastic and is produced advantageously via plastic injection molding. The adapter housing 27 has a base plate 28, wherein the front side of the base plate 28 is widened compared to the rest of the base plate 28. A storage section 29 of elongated shape rises above the base plate 28 of the adapter housing 27.

A further component of the adapter element 16 is a lever-like adjusting element 30, which is integrally formed on the storage section 29 of the adapter housing 27 via at least one solid body hinge 31. The adjusting element 30 also consists of plastic and during the production was similarly extruded onto the adapter housing 27. Advantageously, the adjusting element 30 consists of the same plastic material, whereby the production costs are low, since it can be produced through a minimum component injection molding.

The adjusting element 30 is mounted pivotally on the storage section 29 via the solid body hinge 31. The adjusting element 30 has a manually activatable actuation section 32, which is designed like a handle. The actuation section 32 lies on the one side of the solid-body hinge 31, wherein on the other side an engagement section 33 is provided, which is provided for engagement into complementary engagement element on the running rail 14.

Figure 13:
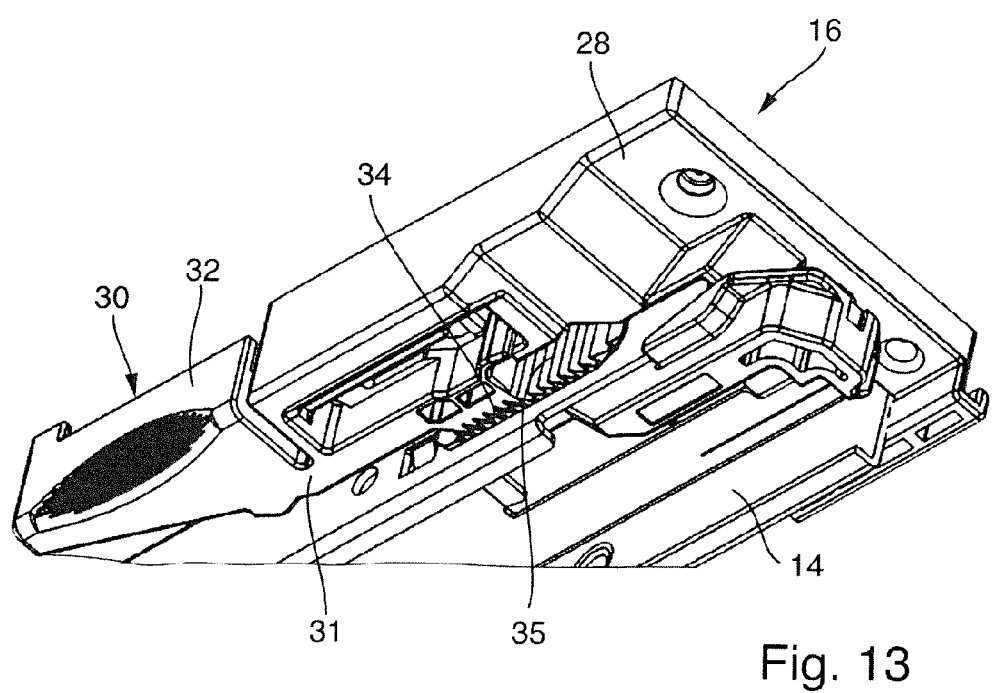
FIG. 13 shows the adapter element with guide rail fastened thereon.

As can be seen in particular in FIG. 13, the engagement section 33 is provided on the other side of the solid body hinge 31 with catch teeth 34. The catch teeth 34 on the engagement section 33 are locked in the position of the adjusting element 30 depicted in FIG. 13 with complementary running rail-catch teeth 35 on the running rail 14, whereby the adapter element 16 is coupled with the running rail 14. Through pressure exerted by fingers of the user on the actuation surface on the actuation section 32 the adjusting element 30 can be pivoted in an anti-clockwise direction about the solid body hinge 31, wherein the catch teeth 34 are released from the running rail-catch teeth 35.

The device 11 also comprises a fastener that fixes the adapter element 16 to a component of the furniture pull-out 13, therefore, to the side wall element 17 in the described exemplary case shown.

In contrast to the prior art, the connection of the adapter element 16 with the side wall element 17 occurs in the exemplary case shown entirely without screws, wherein catch 36 is used for this purpose.

The catch 36 comprises components arranged on the adapter element 16 and other components, which are formed on the side wall element 17.

Figure 5:
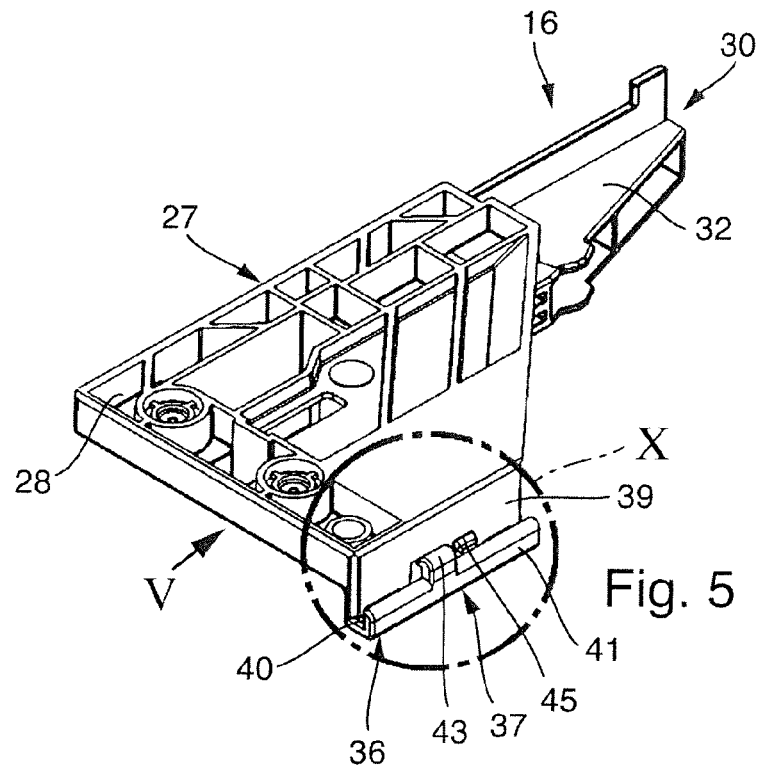
FIG. 5 shows a perspective view of the adapter element diagonally from above according to a second embodiment of the device.
Figure 6:
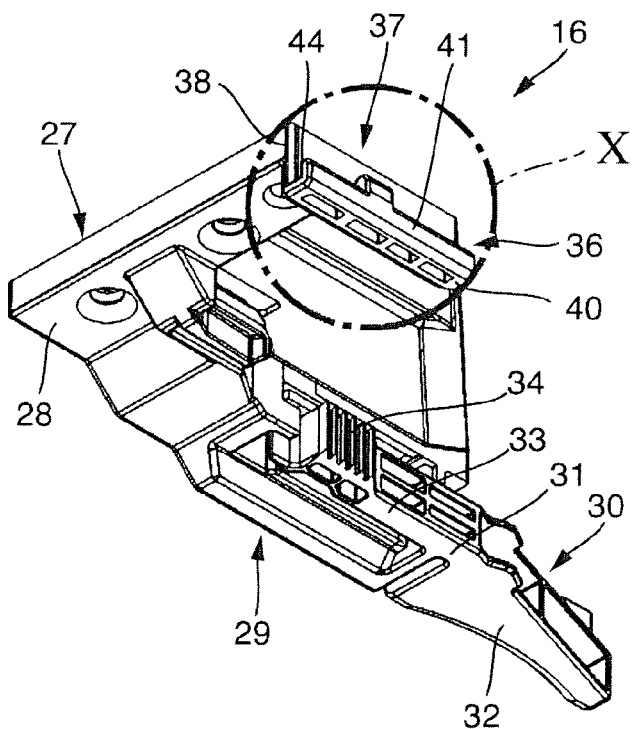
FIG. 6 shows a perspective view of the adapter element of FIG. 5 in the direction of the arrow V from FIG. 5.
Figure 7:
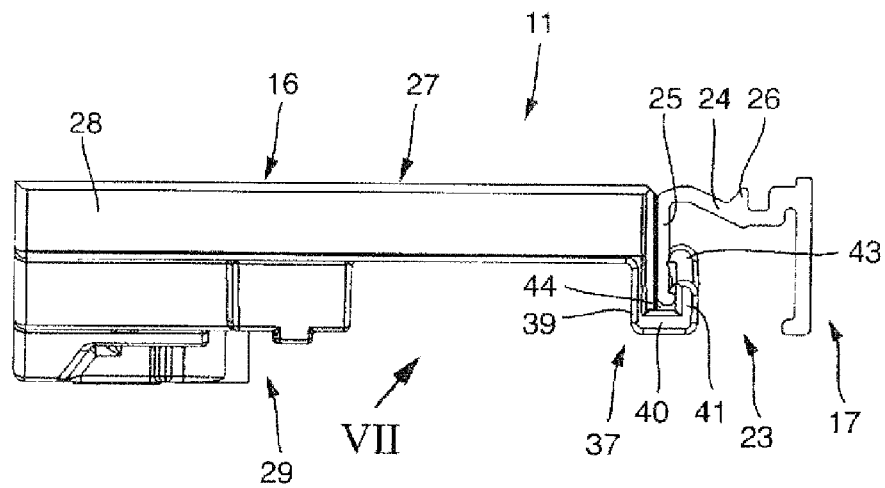
FIG. 7 shows a front view of the device from FIG. 5 with adapter element fastened to the side wall.

As part of the catch 36, the adapter element 16 has a catch section 37, which, as shown particularly in FIGS. 5 and 6, is formed on a side edge 38 of the base plate 28 of the adapter housing 27. The catch section 37 runs substantially perpendicular to the front side of the adapter housing 27 and substantially parallel to the storage section 29. The catch section 37 has a base section 39 designed bar-shaped, positioned on the side edge 38 of the base plate 28, which base section, as shown in particular in FIG. 6, raises a piece far above the surface area of the base plate 28 of the adapter housing 27. The base section 39 is therefore oriented in the longitudinal direction of the adapter element 16. On the base section 39, a bottom 40 extends oriented substantially perpendicular to the latter and connected in one piece with the latter, to which base section an edge bar 41 in turn extends, spaced apart from the base section 39, which runs parallel to the base section 39. Overall, base section 39, bottom 40 and edge bar 41 form a U-shaped fastening profile for fastening to a counter-catch section 42 on the side wall element 17. On the upper edge of the edge bar 41, a hook-shaped, elastically bent catch nose 43 rises, protruding upwards from the upper edge. The catch nose 43 protrudes a piece far into a receptacle groove 44 formed from base section 39, bottom 40 and edge bar 41.

Figure 8:
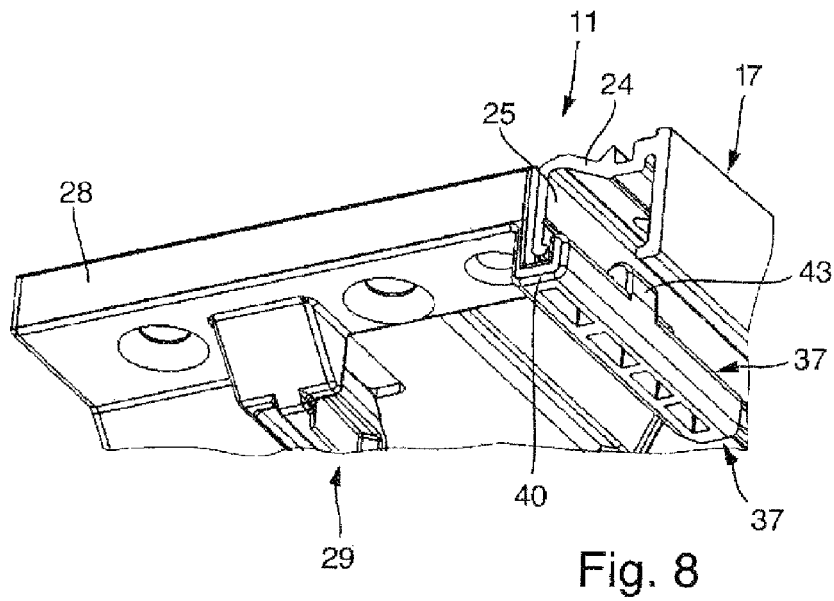
FIG. 8 shows a perspective view of the device of FIG. 7 in the direction of the arrow VII from FIG. 7.
Figure 9:
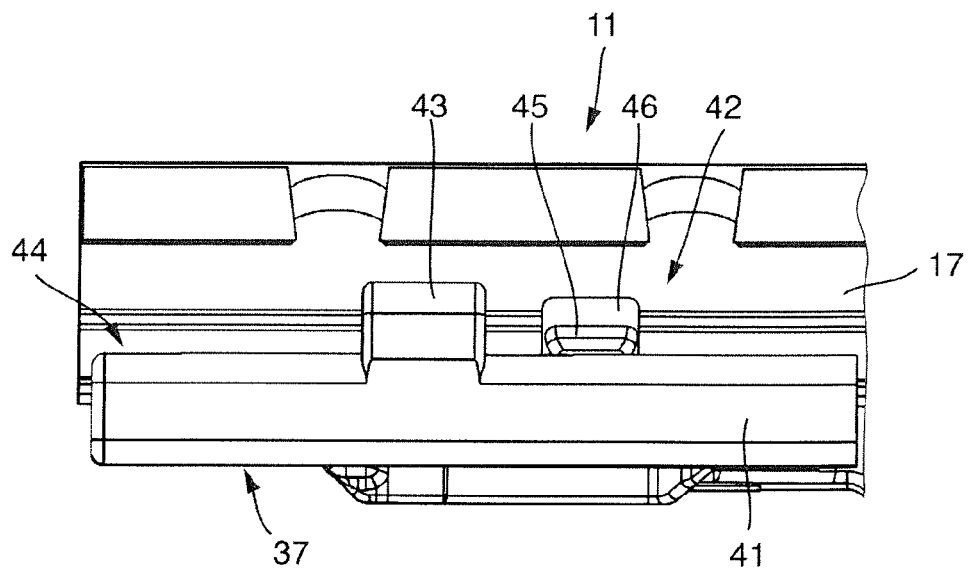
FIG. 9 shows an enlarged view of the detail X from FIGS. 5 and 6.

As depicted particularly in FIGS. 8 and 9, the catch section 37 is positioned on the lower edge of the edge web 25 of the mounting section 23 of the side wall element 17, wherein the edge web 25 of the side wall element 17 dips into the receptacle groove 44 of the catch section 37. Since the first catch nose 43 is mounted elastically bent transverse to the longitudinal direction of the receptacle groove 44, the edge web 25 of the side wall element 17 can be introduced into the receptacle groove 44 by bending up the first catch nose 43 outwards, wherein after the introduction of the edge web 25 the first catch nose 43 is snapped into the groove in the edge web 25 running in the longitudinal direction and thus it is provided, that the adapter element 16 is secured in the height direction of the receptacle groove 44.

Figure 10:
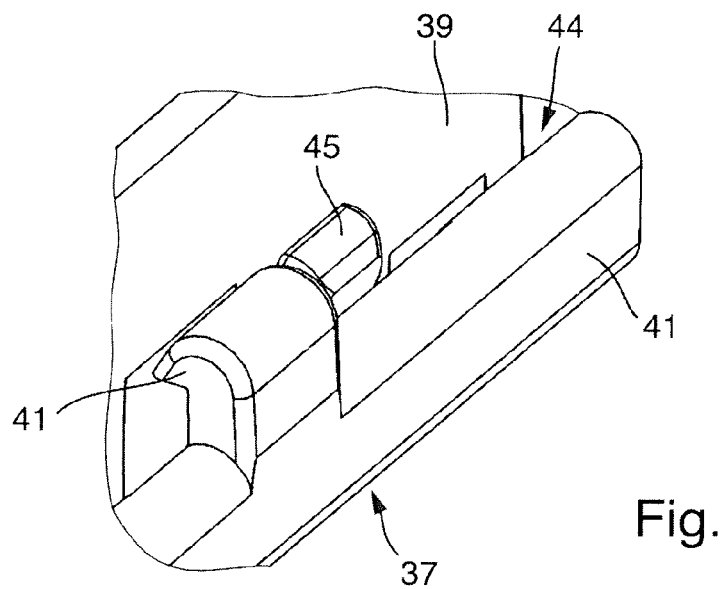
FIG. 10 shows a perspective view of the catch section of the adapter element from FIG. 9.

As can be seen particularly in FIGS. 9 and 10, a catch projection 45 is arranged in the longitudinal direction of the catch section behind the catch nose 43. In contrast to the catch nose 43, the catch projection 45 is not arranged on the edge bar 41, but rather on the base section 39 of the catch section 37. It is positioned on the interior of the base section 39 and protrudes into the receptacle groove 44. The edge web 25 on the side wall element 17 is therefore introduced between the catch projection 45 which is located on one side of the edge web 25 and the catch nose 43 which is arranged on the other side of the edge web 25.

During the introduction and dipping of the edge web 25 of the sidewall element 17 into the receptacle groove 44, the catch projection 45 engages in a recess 46 pushing through the side wall of the edge bar 25 and thus provides for a depth catch of the adapter element 16 on the side wall element 17.

Figure 11:
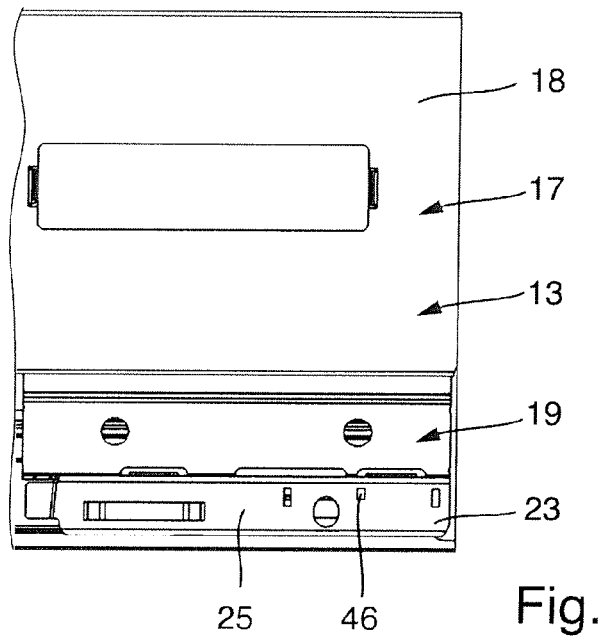
FIG. 11 shows a side view of a first variant of a side wall element with the counter-catch section.
Figure 12:
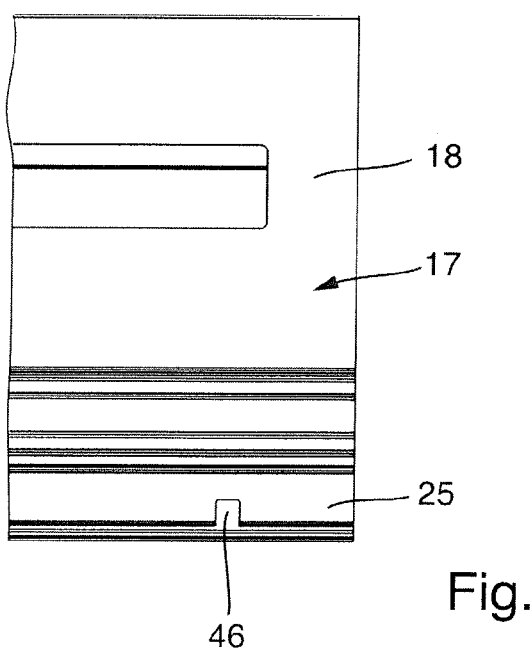
FIG. 12 shows a side view of a second variant of a side wall element with the counter-catch section.

FIGS. 11 and 12 show two different variants of the side wall element 17, wherein the side element 17 according to FIG. 11 consists of steel and the mounting section 23 is a component separate from the base section 18. It is possible for example, that in the edge web 25 several, for example, rectangular recesses 46 are formed.

FIG. 12 shows a variant of the side wall element 17, wherein the latter in this case consists of aluminum and the mounting section 23 is positioned in one piece on the base section 18. Here also the recess 46 can be seen in the edge web 25 of the side wall element 17, into which the catch projection 45 on the adapter element 16 can dip.

What is claimed is:

1. A device for the detachable connection of a furniture pull-out to a furniture body, comprising:
    a guide unit movably guided in a furniture body, the guide unit including:
    a running rail; and
    at least one adapter element detachably connectable to the running rail; the adapter element having a fastener comprising a catch that detachably fastens the adapter element to an assigned component extending from and supported by at least one side wall of a furniture pull-out,
    wherein the catch has catch receptacles and catch members capable of being snapped into the catch receptacle when being snapped into place.

2. A piece of furniture, comprising:
    a furniture body;
    a furniture pull-out movable relative to the furniture body;
    a guide unit movably guided in the furniture body, the guide unit including:
    a running rail; and
    at least one adapter element detachably connectable to the running rail and having a fastener comprising a catch that detachably fastens the adapter element to an assigned component of the furniture pull-out,
    wherein the catch has catch receptacles and catch members capable of being snapped into the catch receptacle when being snapped into place, and
    wherein the furniture pull-out is guided by the guide unit.

3. A device for the detachable connection of a furniture pull-out to a furniture body, comprising:
    a guide unit movably guided in a furniture body, the guide unit including:
    a running rail; and
    at least one adapter element detachably connectable to the running rail and having a fastener comprising a catch that detachably fastens the adapter element to an assigned component of a furniture pull-out,
    wherein the catch has catch receptacles and catch members capable of being snapped into the catch receptacle when being snapped into place.

4. The device according to claim 3, wherein the catch receptacle comprises a bar-shaped base positioned on a side edge of the adapter element, a bottom extending substantially perpendicular to the base, and an edge bar spaced apart from the base.

5. The device according to claim 4, wherein the catch members include a hook-shaped, elastically bent catch nose extending from an upper edge of the edge bar and a catch projection positioned on an interior surface of the base.

6. The device according to claim 5,
    wherein the assigned component comprises an edge web extending from a side wall element of the furniture pull-out, and wherein the edge web is configured to be positioned in the catch receptacle between the catch nose and the catch projection.

7. The device according to claim 6, wherein the catch projection engages in a recess extending through a side wall of the edge bar when the edge bar is positioned in the catch receptacle such that a depth catch of the adapter element can be established on the side wall of the furniture pull-out.

* * * * *